(12) United States Patent
Brown

(10) Patent No.: US 6,710,487 B2
(45) Date of Patent: Mar. 23, 2004

(54) ROTARY DEVICE WITH MATCHED EXPANSION CERAMIC BEARINGS

(75) Inventor: David C. Brown, Northborough, MA (US)

(73) Assignee: GSI Lumonics Corporation, Billerica, MA (US)

( * ) Notice: Subject to any disclaimer, the term of this patent is extended or adjusted under 35 U.S.C. 154(b) by 279 days.

(21) Appl. No.: 09/758,078

(22) Filed: Jan. 10, 2001

(65) Prior Publication Data

US 2001/0030476 A1 Oct. 18, 2001

Related U.S. Application Data

(60) Provisional application No. 60/175,623, filed on Jan. 11, 2000.

(51) Int. Cl.$^7$ ............................. H02K 2/16; H02K 7/18
(52) U.S. Cl. ........................ 310/90; 310/272; 310/36; 384/49; 384/208; 384/492
(58) Field of Search .................. 310/90, 36; 384/49, 384/208, 492; 335/272; 324/154 PB

(56) References Cited

U.S. PATENT DOCUMENTS

| | | | | |
|---|---|---|---|---|
| 3,178,241 A | * | 4/1965 | Braunagel | 384/557 |
| 3,833,924 A | | 9/1974 | Okabe | 360/271.2 |
| 4,302,720 A | * | 11/1981 | Brill | 324/146 |
| 4,770,549 A | * | 9/1988 | Rokkaku et al. | 384/492 |
| 4,997,296 A | | 3/1991 | Narita et al. | |
| 5,052,828 A | | 10/1991 | Ciokajlo et al. | 384/476 |
| 5,059,041 A | * | 10/1991 | Watanabe et al. | 384/476 |
| 5,065,974 A | * | 11/1991 | Lapp | 248/476 |
| 5,094,986 A | * | 3/1992 | Matsumoto et al. | 501/96.3 |
| 5,112,146 A | * | 5/1992 | Stangeland | 384/492 |
| 5,197,808 A | | 3/1993 | Takata | 384/493 |
| 5,214,326 A | * | 5/1993 | Yonei | 310/90 |
| 5,235,180 A | | 8/1993 | Montagu | |
| 5,373,391 A | | 12/1994 | Isobe et al. | 359/216 |
| 5,380,112 A | | 1/1995 | Schicktanz et al. | 403/28 |
| 5,393,209 A | | 2/1995 | Mohr et al. | 418/202 |
| 5,532,729 A | | 7/1996 | Nakasugi | 347/257 |
| 5,596,442 A | * | 1/1997 | Plesko | 359/199 |
| 5,596,443 A | | 1/1997 | Kunno et al. | 359/200 |
| 5,775,816 A | | 7/1998 | Baranek et al. | 384/278 |
| 5,900,903 A | | 5/1999 | Fukita | 347/260 |
| 6,033,408 A | | 3/2000 | Gage et al. | 606/79 |
| 6,048,168 A | | 4/2000 | Sabini | 415/111 |
| 6,142,674 A | | 11/2000 | Bayer | 384/482 |
| 6,304,359 B1 | * | 10/2001 | Gadhok | 310/36 |
| 6,396,589 B1 | * | 5/2002 | Ebihara | 356/601 |
| 6,589,448 B2 | * | 7/2003 | Niwa et al. | 384/49 |

FOREIGN PATENT DOCUMENTS

| | | | |
|---|---|---|---|
| EP | 0 433 483 A1 | 6/1991 | |
| GB | 2304735 A | * 3/1997 | ............ G01D/5/20 |
| JP | 02304215 | 12/1990 | |
| JP | 04165937 | 6/1992 | |
| JP | 2002174249 A | * 6/2002 | ............ F16C/33/32 |
| WO | WO 94/05913 | 3/1994 | |
| WO | WO 95/12912 | 5/1995 | |
| WO | WO 99/43927 | 9/1999 | |

OTHER PUBLICATIONS

Supplementary European Search Report dated Feb. 26, 2003 of European Application No. EP 01 90 4815.

* cited by examiner

*Primary Examiner*—Dang Le
*Assistant Examiner*—J. Aguirrechea
(74) *Attorney, Agent, or Firm*—Maine & Asmus

(57) ABSTRACT

A high precision torque motor, including a partial rotation drive suitable for use in a galvanometer scanner, where the rotor is supported within the stator and housing assembly on all ceramic ball bearings, including inner and outer races and bearing balls. The ceramic ball bearing assemblies and all structural support elements have substantially equal coefficients of expansion through the use of matched expansion, nickel-iron alloy for the rotor shaft, stator, housing and other structural components which contact, locate, and support the inner and outer bearing races. The non-conductive bearings permit exclusion of any grounding conductor strap as between the rotor shaft and the housing.

17 Claims, 2 Drawing Sheets

ROTARY DEVICE WITH MATCHED EXPANSION CERAMIC BEARINGS

CROSS REFERENCE TO RELATED APPLICATIONS

This application relates to and claims priority to U.S. application Ser. No. 60/175,623 filed on Jan. 11, 2000.

BACKGROUND OF THE INVENTION

1. Technical Field of the Invention

This invention relates to high precision rotary components with matched expansion ceramic bearings for use in electronic devices, and in particular, to partial rotation torque motors with matched expansion ceramic bearings for use in galvanometer scanners and like devices.

2. Background Art

Modern galvanometer scanners, which are essentially high precision partial-rotation torque motors with position feedback, are intrinsically long-life devices with no wearing parts other than their bearings. The bearings, however, have relatively short life because of the requirement that they exhibit high geometrical precision, low operating torque, high stiffness, and low electromagnetic noise. All of these attributes are adversely affected by wear. The process of bearing renewal requires that the galvanometer be removed from the equipment in which it is used, sent back to the factory, and finally reinstalled and realigned. This process is costly in terms of the repair work itself, commonly about two thirds the cost of a new galvanometer scanner, and also in terms of the down-time of the end use equipment.

The art in galvanometer design has not discovered a bearing which fulfills the technical requirements as well or better than conventional, instrument quality, rolling element bearings, specifically ball bearings. However, conventional ball bearings are not well adapted to reciprocating motion for the reasons described below, and suffer a reduction in useful life of about a factor of five when compared with equivalent loading in applications in which the bearing can rotate completely around.

If a ball bearing is constructed with two rings, an inner ring mounted to a shaft and an outer ring mounted to a housing, and these rings are separated by a compliment of bearing balls, relative rotation of the rings results in rolling of the balls along tracks on each ring. If this bearing is preloaded axially, so that all the internal clearance between the parts is removed, the balls are constrained against "skidding" on the tracks in normal operation; that is, the initial relationship between the ball surface and the track surfaces is fixed. If this bearing is rotated over a small angle in reciprocation, a definite small portion of each ball rolls over a definite small portion of the track on each ring, and is constrained to move over these same small areas forever.

After even a few minutes of reciprocating, limited rotation operation, the grease or other lubricant present in a reciprocated ball bearing is squeezed out of the high pressure region between the ball poles and the races, and forms a small hill at the boundary between the edge of each ball and the race at both extremes of travel. There is no mechanism to return this lubricant to the high pressure area where it is needed. This "parking" phenomenon is at the root of bearing failure in reciprocating bearings, since unless the bearing can rotate completely around, the lubricant is effectively lost to the replenishment process. This is why failed bearings often seem to have plenty of lubricant left in them. The lubricant is in fact there, but it is not available to the high pressure area where it is needed.

As the squeezing-out process continues, the lubricant layer between the parts becomes thinner and thinner, and eventually the asperities remaining on even the most highly polished surfaces begin to break through the lubricant film, which is now thinner than the height dimension of the asperities. Where the asperities contact each other, they attempt to carry the entire load exerted on the ring-ball interface. Because their area is very small, even though the absolute load may be only a few pounds, the specific load is enormous; in fact, it is way above the compressive strength of steel. This is a problem best known to phonograph record stylus designers, and which lead eventually to the use of diamond for the stylus material.

If the materials of the balls and the rings are the same, or similar, then welding takes place temporarily at these contact points due to the pressure. The weld is immediately broken by the relative motion, leaving behind an even greater number of asperities available for welding. This process is a chain reaction which quickly destroys the bearing. It is a cruel paradox of nature that the highly-finished surfaces which initially provide low-noise precision operation are precisely those which suffer most from welding and so-called "fret corrosion" or false brinelling during boundary lubrication conditions.

This bearing life problem, and the underlying causes, have been understood for some time. The load carrying capacity required of bearings of suitable size is so high that only the highest strength, or more precisely, the highest fatigue limit, materials are suitable. As a result, bearings have generally been made of steel. In particular, the availability of high performance solid lubricants has led to ball bearings in which the rings and balls are made of steel, but either or both are coated with a soft metal film, such as silver or gold, which acts as a lubricant. Unfortunately, such films tend to flow and to wear, building up at the ends of the current ball track, just as liquid or semi-liquid conventional lubricants do. If a larger motion is attempted, the balls must "bump" over these small hills, destroying the geometrical accuracy and noise performance in that region of motion at least.

Another approach has been to coat the balls with a hard film, such as titanium nitride. While the wearing properties of this film are good, and the surface will not normally weld to the steel rings, the film is brittle, so that the deformation of the balls into ellipsoids in service causes micro cracking of the film, leading to sharp abrasive edges and the eventual destruction of the bearing. Hybrid bearings, in which the rings are steel but the balls are ceramic, have been used. However, these bearings have a load rating of only about 70% of the load rating of a similar sized all-steel bearing, because the very high modulus of elasticity of the ceramic ball material resists the deformation of the contact area on the ball into an ellipsoid. As a result, the rings are subjected to a higher compressive stress, leading to fatigue failure of the rings. All other things being equal, the life of a ball bearing in a particular application is related directly to its intrinsic load carrying capacity, so hybrid bearings have failed to demonstrate long life in galvanometer applications in spite of the ability of the ball material to resist micro welding to the races.

In general, the prior art, in the context of the requirements of torque motors for galvanometer scanners, has had as its purpose two distinct goals. The first has been the design of a bearing for extremely high temperature, high-speed, continuous rotation use, where conventional lubricants are unsuitable, and where the high temperature resistance and the great resistance to wear of non-lubricated ceramic materials, makes them attractive. U.S. Pat. Nos. 5,775,816, 5,052,828 and 5,197,808 are in this category. The second goal has been the design of low friction, very high speed, continuous rotation bearings for moderate (room temperature) use, where air is the lubricant. The non-lubricated wear capabilities of ceramics are important here because of the lack of an effective lubricating film during startup and stopping. U.S. Pat. Nos. 5,532,729, 5,596,443, 5,900,903, 5,373,391 and PCT WO99/43927 are examples.

All of these applications are, or can be made to be, tolerant of a certain amount of "springiness", that is, dynamic uncertainty in the position of the axis of rotation with respect to external coordinates. This tolerance is taken advantage of in the design and mounting of the bearing surfaces in the prior art, in allowing parts to take up small clearances during heating, or by providing springs which deflect in response to changes in dimension, or by allowing an axial or radial unconstrained motion, as is the case with all sleeve-type bearings.

In contrast, the galvanometer bearing arrangement can tolerate no such gross dynamic changes in alignment. In galvanometer use, it is generally necessary to locate the axis of rotation within 1 micro-radian or less over very long periods of time, and over the full service temperature range. Also, the gyroscopic and other inertial load and rotor moments on the bearings must be resisted by a stiffness in the location and mounting of the bearings which generally prohibits the use of temperature-compensating springs of any sort. In fact, the inherent stiffness of the bearings themselves, while very high, is the source of the limiting axle-positioning errors in most cases. As a result, the complex, expensive, many-component art taught by these patents is entirely unsuitable for use in a galvanometer and other such rigorously precise rotary applications.

SUMMARY OF THE INVENTION

It is an object of the invention to provide a more rigid, precise, non-electrically conductive, matched expansion bearing assembly for partial rotation torque motors.

Two things have formerly prevented the use of all-ceramic bearings in partial rotation torque motors such as are used in galvanometers. The first is that ceramic materials have been generally assumed to have great compressive and fatigue strength, but little tensile strength. In combination with a coefficient of thermal expansion much smaller than most engineering materials of construction, these properties have made the effective use of precision ceramic parts like bearings extremely difficult in real world applications. These difficulties, in turn, have led to the second impediment, a paucity of demand, with the result that instrument size, all-ceramic bearings are not commercially available.

The instant invention is then well illustrated in a galvanometer scanner incorporating the use of ceramic bearings for their long-life/low electrical conductivity attributes, using matched expansion, nickel-iron alloy for the shafts, which contact, locate, and support the inner rings, using the same alloy for the outer housing which contacts, locates, and supports the outer rings, and excluding the use of a grounding conductor, as is further explained below. Suitable nickel-iron ratios are generally between 30/70% and 70/30%.

Because these parts are dimensionally equivalent to the prior-art galvanometer parts except for their material, all the developed mechanical design art for maintaining the precision of the axis of rotation position is preserved, no additional parts are required, and no penalty is paid for the longer life of the ceramic-material bearings.

There is an additional important benefit to the use of all-ceramic bearings. Prior art has used bearings which are sufficiently electrically conductive to allow the voltages induced in the rotor by its motion in the magnetic field to produce small, uncontrolled current flow through the bearings to the stator housing. Because of the electrical noise generated by these currents, it has been necessary in the prior art to attach a grounding conductor to the rotor to shunt these currents to ground. This electrical conductor, either in the form of brushes or a limp pigtail, has the undesired effect of introducing frictional or torsional torque respectively.

This undesirable torque, and particularly the hysterisis in this torque, places limits on the accuracy to which the axis can be positioned in the rotational sense. The all-ceramic bearings in accordance with the invention have sufficiently low electrical conductivity so that the grounding conductor is unnecessary, improving the accuracy and repeatability of the axle rotational position.

Other objects and advantages of the present invention will become readily apparent to those skilled in this art from the following detailed description, wherein I have shown and described only a preferred embodiment of the invention, simply by way of illustration of the best mode contemplated by me on carrying out my invention. As will be realized, the invention is capable of other and different embodiments, and its several details are capable of modifications in various obvious respects, all without departing from the invention.

DESCRIPTION OF THE PREFERRED EMBODIMENT

Figure 1:
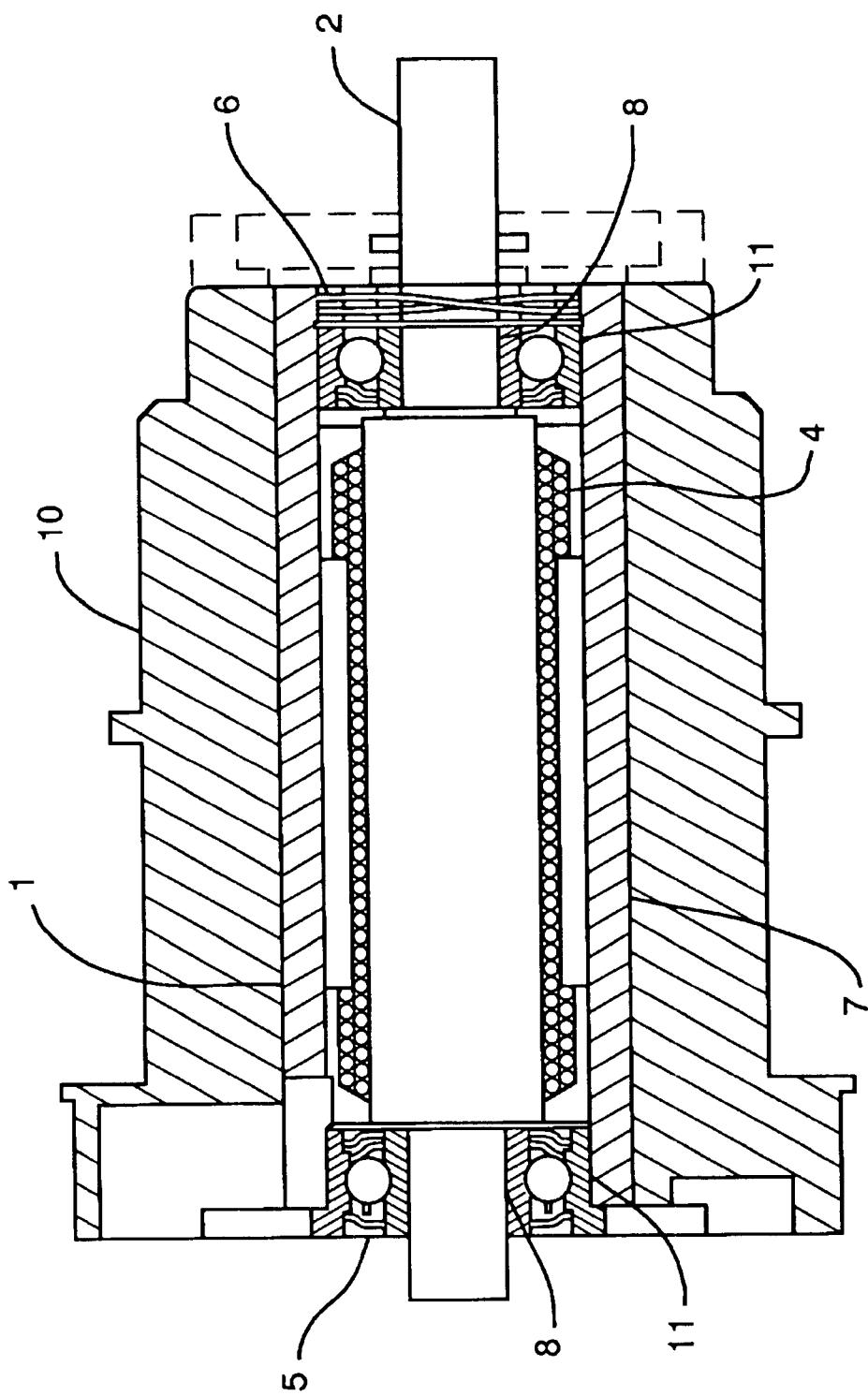
FIG. 1 is cross section view of a galvanometer scanner motor, the elements of which will be readily apparent to those skilled in the art in the context of the explanation which follows.
Figure 2:
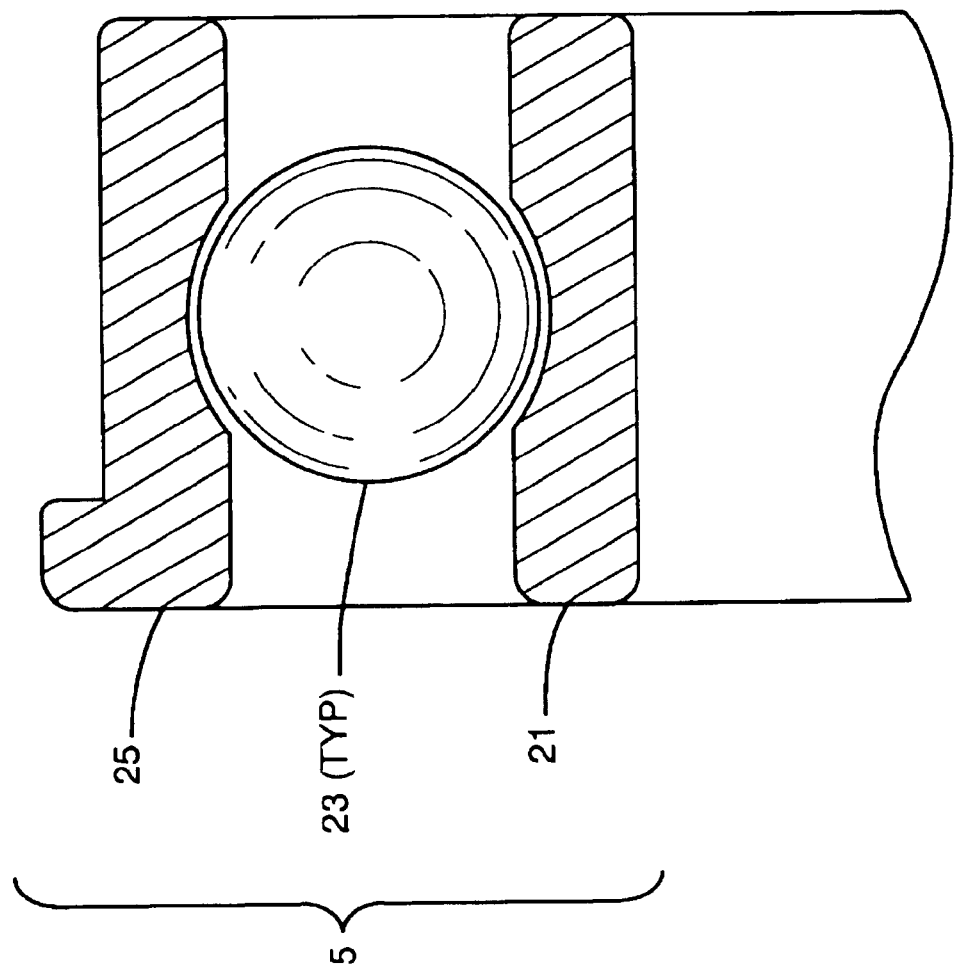
FIG. 2 is a close up view of the ball bearing assembly portion of FIG. 1, illustrating the ceramic inner and outer races and a ceramic ball.

Reference is now made to FIGS. 1 and 2, which illustrate pictorially the elements of a preferred embodiment of the invention, a torque motor for a galvanometer scanner assembly.

Housing 10 encloses stator 1 with its stator winding 4, and rotor 2. Rotor 2 is supported at the rear and front ends of housing 10 by ceramic bearing assemblies 5 and 6 respectively. Bearing assemblies 5 and 6 are functionally identical, each having a ceramic inner race 21, attached by a glue joint 8 to a respective end of rotor 2, and an outer race 25, attached by a glue joint 11 to a respective end of stator 1. Stator 1 is in turn secured by glue joint 7 within housing 10. Housing 10, stator 1 and rotor 2 are all fabricated using matched expansion, nickel-iron alloy ratios generally between 30/70% and 70/30% as is required to match the thermal expansion characteristics of the ceramic bearing assemblies in the normal temperature range of the device.

The ceramic rings, races 21 and 25, used in bearing assemblies 5 and 6 have a compressive strength much higher than that of steel, and the modulus of elasticity is matched with the ceramic balls 23, so that the mutual contact ellipsoids, while smaller than those on equivalent steel bearings, do not produce stresses which exceed the fatigue limit. As a results, these bearings have approximately 130% of the intrinsic load carrying capacity of steel equivalents. The finish which the high hardness of the material permits contains many fewer and much smaller asperities of consequential size, vastly raising the probabilistic encounter threshold. When rare encounters do occur during boundary lubrication conditions, the balls and rings do not weld.

Of course, in addition, the low density of the ceramic parts, the inner ring in particular, race 21, allows higher accelerations while the low inertia of balls 23 permits use of these higher accelerations without causing the balls to skid rather than roll on the race tracks. These attributes expand the performance envelope while extending the life of a galvanometer scanner by a factor of two to five. Further, as was explained above, the ceramic bearings have sufficiently low electrical conductivity so that the grounding conductor of the prior art is unnecessary to typical galvanometer scanner applications, improving the accuracy and repeatability of the axle rotational position.

The commercial consequences of even a modest increase in bearing life are significant when the cost of the down-time of a multimillion dollar machine intended to be running twenty four hours per day, seven days per week, is considered. The several hours such a machine is down for replacement of a galvanometer can cost ten to twenty times the cost of the galvanometer itself, so replacement of the scanner even half as often is a very significant benefit.

As will be readily apparent to one skilled in the art, the invention is capable of other and sundry embodiments. For example, there is within the scope of the invention an electromagnetic induction rotary device containing a rotable shaft and a fixed stator, where the shaft and stator are fabricated of nickel-iron alloy having a predetermined coefficient of thermal expansion. The shaft is supported for rotation within the stator on ceramic bearing assemblies, and the bearing assemblies have the same coefficient of thermal expansion as the rotable shaft, stator, housing, and other structural parts.

As a variation on this example, the rotary device may omit electrical grounding straps from the rotor shaft to the stator, so as to be electrically isolated with regard to direct current flow.

As another example, there is a partial-rotation, torque motor that has a reversibly rotable rotor shaft which is rotationally restricted to less than one full turn in either direction, and a stator and housing assembly within which the shaft is located. The shaft is supported by all ceramic ball bearing assemblies, each including a ceramic inner race that is mounted on the rotable shaft and a ceramic outer race that is mounted in the housing, with multiple ceramic bearing balls interspersed between them. The shaft, and the stator and housing assembly are fabricated of a nickel-iron alloy of matched thermal expansion to the ceramic bearing assemblies for the working temperature range of the device. The shaft is electrically isolated from the stator and housing by the ceramic bearings and the exclusion of any grounding straps as between the shaft and the housing.

As a variation on these examples, there is a partial-rotation, torque motor as described above, for use in a galvanometer scanner.

As a further example, there are embodiments of the invention that may utilize non-lubricated ceramic bearings, to avoid any type of possible contamination or other short coming that might be associated with the use of lubricants in the device.

The objects and advantages of the invention may be further realized and attained by means of the instrumentalities and combinations particularly pointed out in the appended claims. Accordingly, the drawing and description are to be regarded as illustrative in nature, and not as restrictive.

I claim:

1. A galvanometer scanner comprising a partial rotation torque motor with a rotable shaft supported within about one micro-radain of axial precision over substantially the full service temperature range by two, non-lubricated all ceramic ball bearing assemblies, each said ceramic bearing assembly comprising an ellipsodial ceramic inner race, ceramic bearing balls, and an ellipsodial ceramic outer race, said bearing assemblies supported by a bearing support structure, said shaft and said bearing support structure having substantially the same coefficient of thermal expansion as said ceramic assemblies.

2. A galvanometer scanner according to claim 1, said shaft and said bearing support structure fabricated of nickel-iron alloy.

3. A galvanometer scanner according to claim 1, said shaft being electrically isolated from said bearing support structure.

4. A partial rotation torque motor for use in a galvanometer scanner, comprising a rotable shaft supported within about one micro-radian of axial precision over substantially the full service temperature range by at least two all ceramic ball bearing assemblies, said assemblies supported by a bearing support structure, said shaft and said bearing support structure fabricated of nickel-iron alloy, each said ceramic bearing assembly comprising an ellipsodial ceramic inner race, ceramic bearing balls, and an ellipsodial ceramic outer race, said shaft and said bearing support structure having the same coefficient of thermal expansion as said all ceramic bearing assemblies, said shaft being electrically isolated from said bearing support structure.

5. A partial-rotation torque comprising
a reversibly rotable shaft rotationally restricted to less than one full turn, and
a stator and housing assembly within which said shaft is located, said shaft supported within about one micro-radian of axial precision over substantially the full service temperature range by two all ceramic ball bearing assemblies, each said assembly including an ellipsodial ceramic inner race mounted on said rotable shaft and an ellipsodial ceramic outer race mounted in said housing and multiple ceramic bearing balls interspersed in a single plane there between said shaft said stator and said housing assembly fabricated of a nickel-iron alloy of matched thermal expansion to said all ceramic bearing assemblies, said shaft being electrically isolated from said stator and said housing.

6. A partial-rotation torque motor according to claim 5, for use in a galvanometer scanner.

7. An electromagnetic induction reciprocating rotary device comprising a rotable shaft supported for rotation within about one micro-radian of axial precision over substantially the full service temperature range by at least two all ceramic ball bearing assemblies, each said assembly including an ellipsodial ceramic inner and outer race with multiple ceramic bearing balls interspersed in a single plane between, said ball bearing assembly being supported by a bearing support structure wherein said shaft, said bearing support structure and said ball bearing assembly have a substantially similar coefficient of thermal expansion.

8. An electromagnetic induction reciprocating rotary device according to claim 7, said rotable shaft comprising a reversibly rotable shaft rotationally restricted to less than one full turn.

9. An electromagnetic induction reciprocating rotary device according to claim 7, wherein said shaft and said bearing support structure are fabricated of a nickel-iron alloy having a substantially similar coefficient of thermal expansion to said all ceramic bearing assembly.

10. An electromagnetic induction reciprocating rotary device according to claim 7, wherein said shaft is electrically isolated from said bearing support structure.

11. An electromagnetic induction reciprocating rotary device according to claim 7, said device comprising a partial rotation torque motor for use in a galvanometer scanner.

12. A galvanometer scanner according to claim 7, said outer race being attached by a glue joint to said bearing support structure, said inner race being attached by a glue joint to said shaft.

13. A method for providing improved shaft alignment, acceleration and bearing life in an electromagnetic induction rotary device comprising the steps:

supporting a shaft for partial rotation within about one micro radian of axial precision over substantially the full service temperature range with an all ceramic bearing assembly comprising an ellipsodial ceramic inner race attached to the shaft, an ellipsodial ceramic outer race and a plurality of ceramic rotating members captured there between, said inner race, outer race and rotating members having substantially the same coefficient of thermal expansion;

supporting the outer race in a fixed bearing support structure; and fabricating the shaft and the bearing support structure from a material having a substantially similar coefficient of thermal expansion as said inner race, outer race and rotating members.

14. A method for providing improved shaft alignment, acceleration and bearing life according to claim 13, said material for said fabricating of the shaft and the bearing support structure comprising a nickel-iron alloy.

15. A method for providing improved shaft alignment, acceleration and bearing life according to claim 13, said electromagnetic induction rotary device comprising a partial rotation torque motor for use in a galvanometer scanner.

16. A partial rotation torque motor according to claim 13, said step of supporting the shaft for rotation with an all ceramic bearing assembly comprising attaching said inner race to said shaft with a glue joint.

17. A partial rotation torque motor according to claim 13, said step of supporting the outer race in a fixed bearing support structure comprising attaching said outer race to said fixed bearing support structure with a glue joint.

* * * * *